United States Patent Office 3,341,278
Patented Sept. 12, 1967

3,341,278
DYEING METALLIZED POLYOLEFINS WITH BENZOTHIAZOLEAZONAPHTHOL DYES
Paul L. Stright, Hamburg, N.Y., assignor to Allied Chemical Corporation, New York, N.Y., a corporation of New York
No Drawing. Original application Feb. 28, 1963, Ser. No. 261,862, now Patent No. 3,245,981, dated Apr. 12, 1966. Divided and this application Feb. 23, 1966, Ser. No. 549,073
5 Claims. (Cl. 8—42)

This invention relates to novel water-soluble monoazo compounds. More particularly it is concerned with water-insoluble 2 - (6-alkoxy-2-benzothiazolylazo)-4-alkoxy-1-naphthols which are useful for the coloration of normally solid polymers of α-olefins having 2 to 3 carbon atoms in each unit and containing a Werner complex forming metal.

This application is a division of application Ser. No. 261,862, filed Feb. 28, 1963, which application is a continuation-in-part of my copending application Ser. No. 196,921, filed May 23, 1962, which discloses a process for dyeing normally solid polymers of α-olefins having 2 to 3 carbon atoms and containing a Werner complex forming metal which comprises contacting said solid polymer with an aqueous dispersion of a benzothiazolylazo compound which contains at least one group capable of forming a metal chelate with said metal.

Polymers of α-olefins such as ethylene and propylene have been produced in steadily increasing quantities and grades in recent years, and because of their many valuable characteristics including mechanical strength, high elasticity, resistance to solvents and other elements, they have found their way into a multitude of useful applications in the form of films, filaments, yarns, fabrics, ropes, molded products, and the like. However, because of their extreme chemical inertness and hydrophobic character, these materials have shown little affinity for dyestuffs and pigments generally available for the coloration of natural and synthetic materials. Thus attempts to effect the coloration of α-olefin polymers by compounding pigments into the resin, as in Banbury mixers, compound extruders or the like, were not entirely satisfactory due to the difficulty in obtaining adequate dispersion of the pigment.

The receptivity of the polymers for known classes of dyestuffs has been improved by grafting or otherwise introducing polymeric chains containing functional groups to the polyolefin. However, such measures while successful add to the cost of the resultant fiber.

An object of the present invention is to devise novel monoazo dyestuffs suitable for application to polyolefins.

Another object is to devise novel groups of water insoluble benzothiazolylazonaphthol compounds which dye polyolefins containing a Werner complex forming metal in bright blue shades of exceptional fastness characteristics.

These and other objects will be obvious from the following description of my invention.

The novel dyestuffs of this invention possess the following general formula

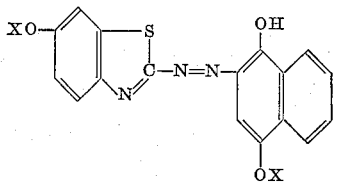

wherein X stands for a lower alkyl group and the aromatic nuceli may be further substituted by non-water solubilizing substituents such as lower alkyl, lower alkoxy, halogen, nitro, N,N-diethyl sulfamyl, N-methyl sulfamyl, carboxyamide, and the like.

These novel products can be prepared by several well known methods generally used for the preparation of monoazo dyes. Preferably, a 2-amino-6-alkoxy-benzothiazole is diazotized and then coupled in into a 4-alkoxy-1-naphthol in aqueous alkaline medium. The product is practically insolube in the coupling mass and can conveniently be isolated therefrom by filtration or similar means. The isolated product can be prepared for use as a disperse dyestuff by admixture with dispersing agents and the dyestuff composition applied as disclosed in the aforementioned co-pending U.S. application.

The novel products of this invention have the surprising property of dyeing normally solid polymers of α-olefins having two to three carbon atoms and containing a Werner complex forming metal in bright blue shades of excellent fastness characteristics. Corresponding dyestuffs derived from 1-naphthol instead of 4-alkoxy-1-naphthol give rise to dyestuffs yielding somewhat weaker shades of inferior fastness characteristics.

As illustrative of the benzothiazole components suitable for use in the preparation of my novel dyestuffs the following can be mentioned:

2-amino-6-methoxybenzothiazole
2-amino-6-ethoxybenzothiazole
2-amino-6-n-butoxybenzothiazole
2-amino-6-amoxybenzothiazole
2-amino-6-hexoxybenzothiazole
2-amino-6-ethoxy-4-ethylbenzothiazole
2-amino-4-chloro-6-ethoxybenzothiazole
2-amino-5,6-dimethoxy-benzothiazole
2-amino-6-methoxy-4-N-methylsulfamylbenzothiazole
2-amino-6-ethoxy-5-nitrobenzothiazole As typical of the 4-alkoxy-1-naphthol component suitable for use in the present invention, the following are mentioned:

4-methoxy-1-naphthol
4-ethoxy-1-naphthol
4-propoxy-1-naphthol
4-butoxy-1-naphthol
4-hexoxy-1-naphthol
5-nitro-4-ethoxy-1-naphthol
6-bromo-4-methoxy-1-naphthol
4-ethoxy-8-N-methylsulfamyl-1-naphthol
8-N,N-diethylsulfamyl-4-methoxy-1-naphthol
5,7-dichloro-4-methoxy-1-naphthol
5,7-dibromo-4-ethoxy-1-naphthol The novel dyestuffs of the present invention are substantially insoluble in the aqueous dyebath, which is preferably maintained at a pH of 5 or less. They are applied in the form of aqueous dispersions in the manner of the well known "disperse dye" class. Such dyes, as is known, are in a finely divided condition and usually are assisted by intimate admixture with dispersing agents and other dyeing assistants. The dispersing agents may be of the anionic, cationic or preferably non-ionic class.

The amount of dyestuff employed relative to the amount of polyolefin material to be dyed can be varied over a wide range. The particular amount used will depend to a major extent upon the depth of shade desired. In most instances, deep shades can be obtained from 0.5% dyeings, which shades are increased but little in intensity by increasing the dye concentration to 2.0% or more. Light shades can be obtained by the use of as little as 0.05% or less of the dyestuff.

Although the novel compounds of the present invention are of particular value as colorants for polypropylene containing a Werner complex forming metal, they can also be used to impart bright blue shades of excellent fastness properties to other synthetic fibers, e.g., cellulose esters (e.g. "Arnel"), polyesters (e.g. "Dacron"), polyamides ("nylon") and the like.

The following examples illustrate the present invention. The temperatures are given in degrees centigrade and parts and percentages are by weight unless otherwise specified.

*Example I*

A mixture of 38.8 parts of 2-amino-6-ethoxy-benzothiazole, 32 parts of 100% sulfuric acid, and 76 parts of water was poured into 1030 parts of 50° Bé. sulfuric acid and the mass was cooled to 5°. To this were added 300 parts of nitrosylsulfuric acid (prepared by dissolving 93 parts of sodium nitrite in 1200 parts of 100% sulfuric acid) in one hour and the mixture was agitated for two hours. Thereafter, the excess nitrous acid was destroyed with sulfamic acid. The solution was divided into two equal portions.

A. One portion of the diazo solution was added to over about two hours to a filtered, cold (below 5°), solution of 14.5 parts of 4-methoxy-1-naphthol, 20 parts of sodium carbonate, about 15 parts of 50° Bé. aqueous caustic soda in 500 parts of water. The coupling mixture was kept at below 10° and maintained alkaline by the addition of 50° Bé. aqueous caustic soda. Thereafter the agitated mixture was permitted to warm up to ambient temperature and the mass was agitated for about 16 hours. The resulting slurry was filtered and the filter cake was reslurried in hot water for about ½ hour. The slurry was filtered and the cake was washed with 1000 parts of cold water and then with 500 parts of 20% aqueous sodium chloride containing ½% sodium hydroxide. The washed cake was reslurried in 1000 parts of water for ½ hour, the slurry rendered neutral to Nitrazine Yellow by the addition of 20° Bé. hydrochloric acid and the resulting slurry, after being agitated for about 16 hours, was filtered and washed chloride-ion free with water. The product, 2-(6-ethoxy-2-benzothiazolylazo)4-methoxy-1-naphthol, was a black powder melting at 152°–160°. It dyed polypropylene containing 0.12% of a nickel compound calculated as nickel a strong bright blue shade of excellent fastness to light, to washing and to dry cleaning solvents. This product also dyed "nylon" and "Arnel" in deep shades.

B. The remaining portion of the diazo solution was coupled into 1-naphthol by substantially the same procedure. The resulting monoazo product was applied to polypropylene of the aforesaid type but gave relatively weak blue shades of poorer fastness to light than the product of Part A of this example.

*Example II*

The procedure of Example I, Part A, was repeated with the exception that in place of 2-amino-6-ethoxybenzothiazole, an equivalent quantity of 2-amino-6-methoxybenzothiazole was used. The resulting monoazo product, 2-(6-methoxy-2-benzothiazolylazo)-4-methoxy-1-naphthol dyed polypropylene, containing 0.12% of a nickel compound calculated as nickel, strong bright blue shades of excellent fastness characteristics. This dyed polypropylene was practically indistinguishable from the polypropylene dyed with the closely analogous dyestuff prepared in Example I, Part A.

*Example III*

The procedure of Example I, Part A, was repeated with the single exception that in place of 4-methoxy-1-naphthol, an equimolecular quantity of 5,8-dichloro-4-methoxy-1-naphthol was used as the coupling component. The resulting monoazoproduct, 2-(6-ethoxy-2-benzothiazolylazo) - 5,8-dichloro-4-methoxy-1-naphthol, produced strong bright blue shades of somewhat reddish hue of excellent fastness properties on polypropylene of the aforesaid type.

*Example IV*

One part of the water insoluble monoazo dyestuff of the formula

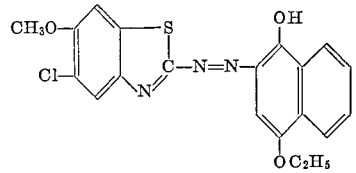

which was prepared by coupling diazotized 2-amino-5-chloro-6-methoxybenzothiazole with 4-ethoxy-1-naphthol in alkaline solution according to the procedure of Example IA above, was mulled with 5 parts of diethylene glycol and 0.1 part of Triton X–100 (isooctylphenyl ether of polyoxyethylene glycol) was added. After the addition of about 4000 parts of warm (40°) water, 100 parts of isotactic polypropylene (containing an organic nickel compound in the amount of about 0.12% nickel) were entered into the dyebath and worked therein as the bath was gradually heated to boiling. The dyeing was continued at the boil for one hour. The dyed fiber was removed from the bath, washed well in 0.25% soap solution at 60°, rinsed in warm water and dried. The fiber was colored a bright blue shade which possessed excellent fastness to light, to washing, to dry cleaning solvents and to crocking.

It can thus be seen that a novel group of benzothiazolylazonaphthol dyestuffs has been provided which dye polyolefins containing a Werner complex forming metal in deep shades of excellent fastness characteristics.

As will be evident to those skilled in this art, the invention is not to be limited to the details of the foregoing purely illustrative examples and that changes in said details can be made without departing from the scope or spirit of my invention.

I claim:

1. The process for dyeing normally solid polymers of α-olefins having 2 to 3 carbon atoms and containing a Werner complex forming metal which comprises contacting said polymer with an aqueous dispersion of a monoazo compound having the formula

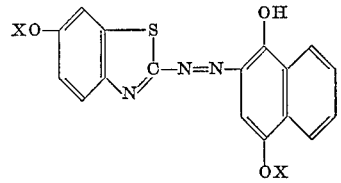

wherein X represents a lower alkyl group and wherein the aromatic nuclei are unsubstituted or further substituted by radicals selected from the group consisting of lower alkyl, lower alkoxy, halogen, nitro, N,N-diethyl sulfamyl and N-methyl sulfamyl.

2. The process of claim 1 wherein the monoazo compound is 2-(6-ethoxy-2-benzothiazolylazo)-4-methoxy-1-naphthol.

3. A polymer of an α-olefin having 2 to 3 carbon atoms and containing a Werner complex forming metal dyed by the process of claim 1.

4. A polymer of an α-olefin having 2 to 3 carbon atoms and containing a Werner complex forming metal dyed by the process of claim 2.

5. Process defined in claim 1, wherein the solid polymer is present in the form of a fiber.

References Cited

UNITED STATES PATENTS

| | | | |
|---|---|---|---|
| 2,857,371 | 10/1958 | Straley et al. | 8—42 |
| 2,857,372 | 10/1958 | Straley et al. | 8—42 XR |
| 2,984,634 | 5/1961 | Caldwell et al. | 8—55 |
| 3,097,196 | 7/1963 | Straley et al. | 8—42 XR |
| 3,164,438 | 1/1965 | Thomas | 8—46 |
| 3,186,788 | 6/1965 | Mills | 8—55 |

DONALD LEVY, *Primary Examiner.*